United States Patent
Sausset et al.

(10) Patent No.: US 9,669,558 B2
(45) Date of Patent: Jun. 6, 2017

(54) METHOD FOR CUTTING OUT ONE OR MORE GLASS PANELS

(71) Applicant: SAINT-GOBAIN GLASS FRANCE, Courbevoie (FR)

(72) Inventors: François Sausset, Paris (FR); Laurent Vilain, Chatenay Malabry (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/769,557

(22) PCT Filed: Feb. 24, 2014

(86) PCT No.: PCT/FR2014/050386
§ 371 (c)(1),
(2) Date: Aug. 21, 2015

(87) PCT Pub. No.: WO2014/128424
PCT Pub. Date: Aug. 28, 2014

(65) Prior Publication Data
US 2015/0375415 A1    Dec. 31, 2015

(30) Foreign Application Priority Data
Feb. 22, 2013  (FR) .................................. 13 51541

(51) Int. Cl.
*G05B 19/18*    (2006.01)
*B26D 5/00*    (2006.01)
(Continued)

(52) U.S. Cl.
CPC ............. *B26D 5/005* (2013.01); *B26D 1/085* (2013.01); *C03B 33/037* (2013.01);
(Continued)

(58) Field of Classification Search
CPC ...... B26D 5/005; B26D 1/085; G05B 19/182; G05B 19/4097; G05B 2219/45009;
(Continued)

(56) References Cited

U.S. PATENT DOCUMENTS 8,244,394 B2 * 8/2012 Nagy .................. C03B 27/00
700/157
2004/0134231 A1   7/2004 Oya
(Continued)

FOREIGN PATENT DOCUMENTS

WO    WO 2012/164200 A1    12/2012

OTHER PUBLICATIONS

International Search Report as issued in International Patent Application No. PCT/FR2014/050386, dated Jun. 30, 2014.

*Primary Examiner* — Ryan Jarrett
(74) *Attorney, Agent, or Firm* — Pillsbury Winthrop Shaw Pittman LLP

(57) ABSTRACT

A method for cutting out pieces of glass from a glass sheet, includes, a step of automatic generation by a computer with a storage unit, containing programs to calculate a first optimum plan for guillotine cutting at a number of hierarchical levels of different pieces from each of the glass sheet, as a function of information; a step of reading information relating to defects in the glass sheet, a step of automatic generation by a computer with a storage unit, containing programs to calculate a second optimum plan for guillotine cutting at a number of hierarchical levels from the glass sheet, based on the first optimum cutting plan and at least some of the information relating to the defects, including permutations of cross cut sections at the same hierarchical level within the glass sheet; a step of cutting pieces of glass in accordance with the second optimum cutting plan generated.

22 Claims, 6 Drawing Sheets

(51) Int. Cl.
*C03B 33/037* (2006.01)
*G05B 19/4097* (2006.01)
*B26D 1/08* (2006.01)

(52) U.S. Cl.
CPC ....... *G05B 19/182* (2013.01); *G05B 19/4097* (2013.01); *G05B 2219/35162* (2013.01); *G05B 2219/45009* (2013.01); *Y02P 40/57* (2015.11); *Y02P 80/40* (2015.11)

(58) Field of Classification Search
CPC ......... G05B 2219/35162; C03B 33/037; Y02P 40/57; Y02P 80/40
See application file for complete search history.

(56) References Cited

U.S. PATENT DOCUMENTS

| | | | |
|---|---|---|---|
| 2004/0236458 A1* | 11/2004 | Clayton | G05B 19/4097 700/171 |
| 2004/0236459 A1* | 11/2004 | Clayton | G05B 19/4097 700/171 |
| 2005/0023337 A1 | 2/2005 | Benischke et al. | |
| 2005/0043838 A1* | 2/2005 | Clayton | C03B 33/037 700/100 |
| 2015/0310448 A1* | 10/2015 | Vilain | G06Q 10/043 705/51 |

\* cited by examiner a)

b)

c)

d)

METHOD FOR CUTTING OUT ONE OR MORE GLASS PANELS

CROSS REFERENCE TO RELATED APPLICATIONS

This application is the U.S. National Stage of PCT/FR2014/050386, filed Feb. 24, 2014, which in turn claims priority to French Application No. 1351541, filed Feb. 22, 2013, The contents of all of these applications are incorporated herein by reference in their entirety.

The present invention relates to the field of cutting pieces of glass from large glass sheets.

Glass is generally manufactured in the form of a continuous ribbon, for example a continuous ribbon of float glass or cast glass.

This ribbon is then cut into glass sheets called "mother glass" (literally "verre mére" in French although this term is not used); these sheets are, for example, "PLF" sheets (large format sheets), typically having dimensions of 3.21 m by about 6 m, or "DLF" sheets, with dimensions of about 2.55 m by 3.21 m.

A step of defect analysis is performed before this cutting, in order to determine whether the glass ribbon meets specifications in terms of defects. If any defects not meeting the specification are found, the mother glasses are cut, with the removal of a certain length of the ribbon corresponding to the part of the ribbon not meeting the specification.

In a variant, the defects are, for example, marked with ink so that they can be identified subsequently without a further analysis. After cutting, the mother glasses can then be stacked in different stacks, according to the defect specification classes.

The mother glasses can then undergo one or more processing procedures (for example, deposition of a coating, lamination, etc.).

After each process, the mother glasses are, for example, analyzed to detect any faults and thus to determine whether the quality meets a predetermined specification. If this is not the case, the mother glass is rejected.

US-A-2004/0134231 describes a method for cutting out glass substrates for LCD screens from mother glasses. The mother glasses are identified, and the information about the defects of each mother glass such as the position, the size or the type of defects is stored so that the cutting of LCD substrates of different sizes can be optimized as a function of the defect information for each mother glass.

Different predetermined cutting plans are, for example, combined with different mother glasses and different acceptance criteria so as to maximize the number of LCD substrates that can be cut out from a set of mother glasses.

However, it has been found that this optimization is sometimes difficult to achieve, because the information relating to the defects of each sheet is not always available at the moment when the optimization has to be started.

Furthermore, even if this information is available, production problems such as the breakage of a sheet, a change of order in unstacking, or the like, may adversely affect the optimization achieved previously.

One object of the invention is to provide a method for reducing the losses due to defects in the glass.

According to one aspect of the invention, a method is proposed for cutting out a plurality of pieces of glass from at least one glass sheet, comprising, in sequence:

a step of automatic generation by a computer with a storage unit, containing programs adapted to calculate a first optimum plan for guillotine cutting at a number of hierarchical levels (X, Y, Z, V) of different pieces from each of said at least one glass sheet, as a function of information such as the size of the pieces to be cut out; and a step of reading information relating to defects in said at least one glass sheet, wherein the method comprises, additionally and subsequently:

a step of automatic generation by a computer with a storage unit, containing programs adapted to calculate a second optimum plan for guillotine cutting at a number of hierarchical levels from said at least one glass sheet, on the basis of said first optimum cutting plan and as a function of at least some of the information relating to the defects, including permutations of cross cut sections at the same hierarchical level within said at least one glass sheet;

a step of cutting pieces of glass in accordance with said second optimum cutting plan generated.

It should be noted that, throughout the text, the term "automatic" is taken to mean an action performed by a machine executing a recorded program.

The term "glass sheet" is taken to mean any sheet of glass with finite predetermined dimensions, regardless of whether it is a PLF, a DLF or a sheet of any other format.

It should also be noted that "cutting from a glass sheet" is taken to mean cutting from a bare glass panel or from one on which a coating has been deposited.

The method according to the invention has the advantage of allowing further optimization of the method of cutting glass panels from a glass sheet of large dimensions or from a group of more than one glass sheets while allowing for defects in the glass.

According to specific embodiments, the method has one or more of the following characteristics, considered separately or jointly in all technically feasible combinations:

the permutations of the cross cut sections are carried out with a constant offcut surface area between the first optimum cutting plan and the second optimum cutting plan;

said automatic generation is carried out with a constant number and size of offcuts;

said first optimum cutting plan and said second optimum cutting plan are those of a single glass sheet;

said first optimum cutting plan and said second optimum cutting plan are the cutting plans of a plurality of glass sheets;

the step of automatic generation of the second cutting plan includes permutations of the first optimum cutting plan of a glass sheet from among said plurality of glass sheets with the first optimum cutting plan of another glass sheet from among said plurality of glass sheets;

a complexity value is assigned to each of the first optimum cutting plans of each of said plurality of glass sheets, the permutations between first optimum cutting plans being carried out on a priority basis as a function of said complexity values;

said complexity values are assigned as a function of at least one of the number of offcuts, the surface area of the offcuts, and the distribution of the offcuts in the different hierarchical levels of the guillotine cutting;

the permutations of the cross cut sections are carried out in conformity with the constraints;

the constraints include constraints as to the order of cutting of said pieces;

the constraints include constraints as to the position of the offcuts;

the computer is programmed to list said permutations of the cross cut sections, the new cutting plan produced after a permutation being accepted or rejected by the computer as a function of performance criteria of the resulting cutting plan with respect to the preceding cutting plan;

said permutations of cross cut sections are listed by the computer in an order chosen as a function of the properties of the cross cut sections;

said properties of the cross cut sections include at least one of the number of offcuts, the number of pieces to be cut out, and the surface area of the offcuts;

the defects to be eliminated are prioritized by the computer;

the defects are prioritized as a function of their position;

said information concerning the defects includes severity values assigned to at least some of the defects, the automatic generation of the second cutting plan being performed by the computer as a function of said severity values;

said performance criteria include the elimination of the most severe defect;

said permutations are stopped after a predetermined computing time, even if other permutations were programmed, the final cutting plan produced by the computer then becoming said second cutting plan;

said predetermined time interval is less than one minute for a machine performing about $10^{10}$ (floating point) operations per second (Gflops);

some of the pieces to be cut out have different dimensions; and the method comprising, before the automatic generation of said first optimum cutting plan:
a step of analyzing defects in said least one glass sheet (8);
a step of storing information relating to the defects detected in said at least one glass sheet (8), the reading step performed after the automatic generation of the first optimum cutting plan comprising a step of identifying said at least one glass sheet (8) and a step of accessing the information stored in said step of defect analysis.

The invention will be more clearly understood with the aid of the following description, provided solely by way of example, which refers to the attached figures, in which.

Figure 3A:
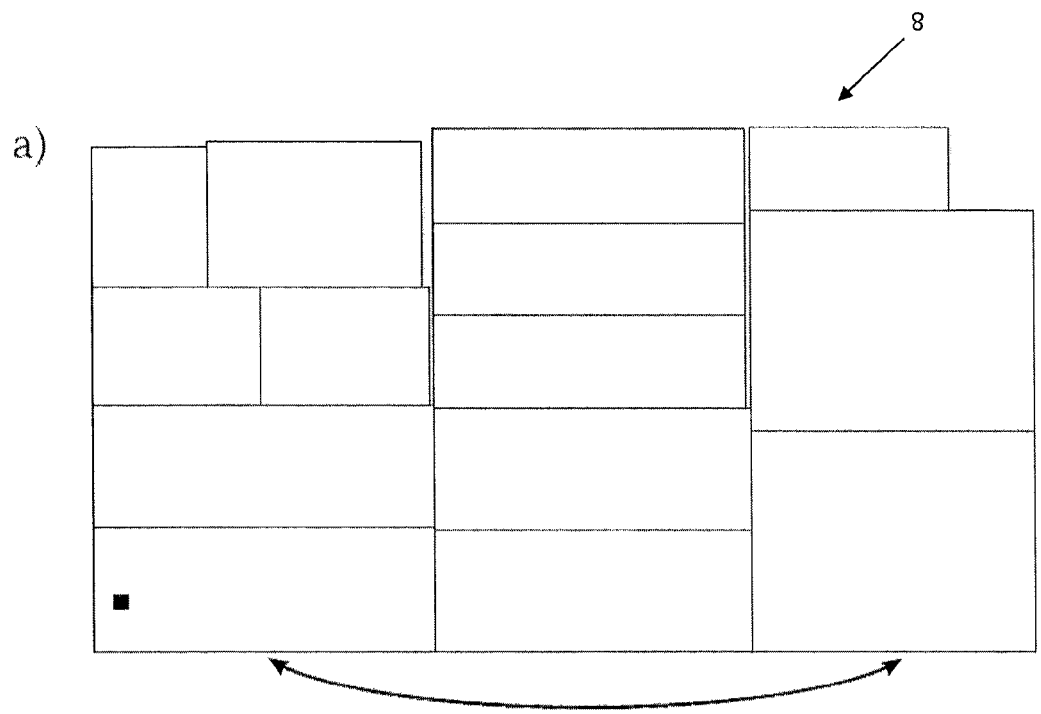
Figure 4:
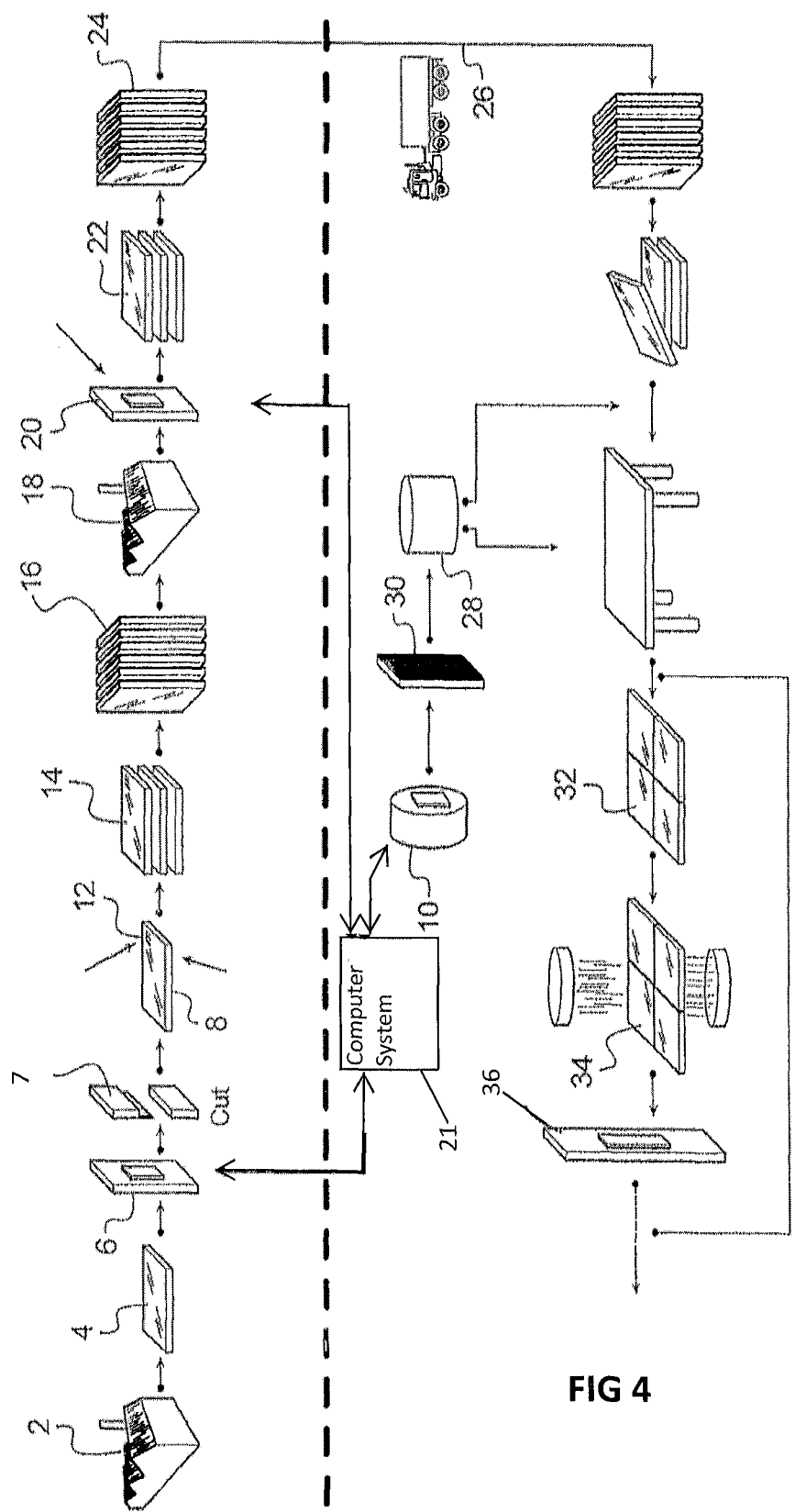
Figure 5:
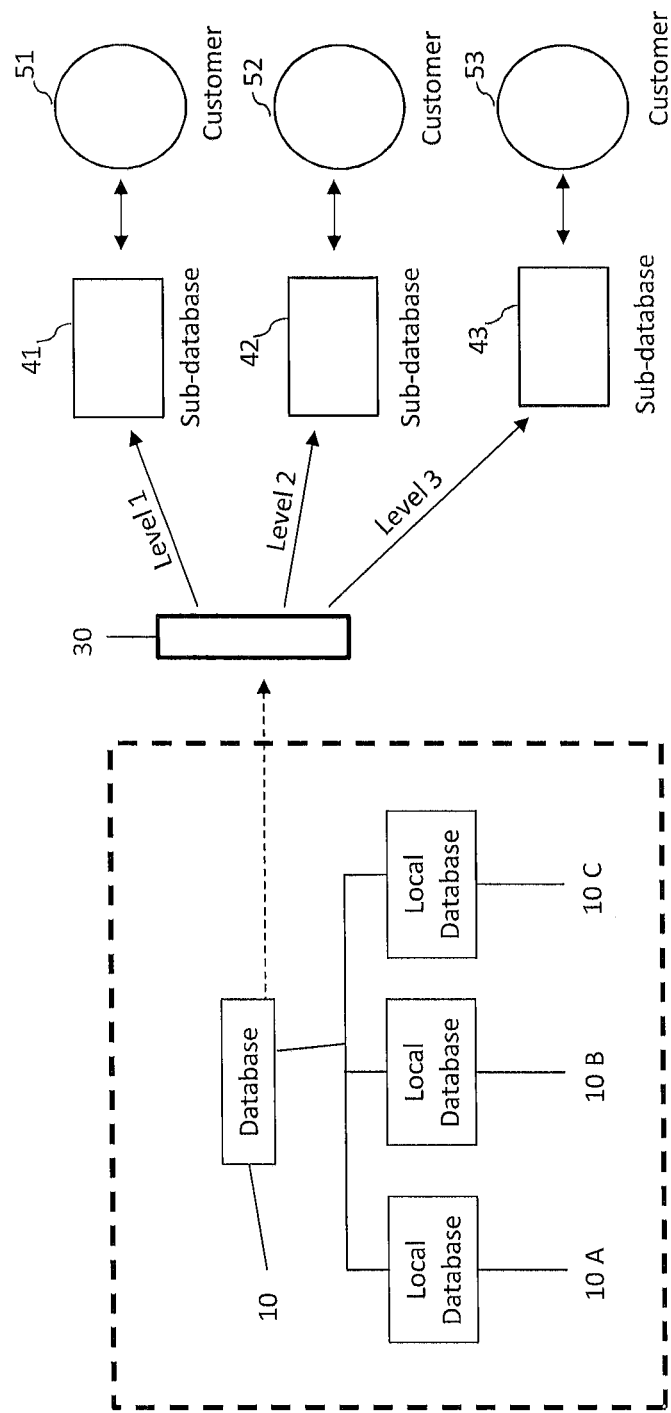

FIGS. 3a) to 3d) are diagrams of the cutting plans illustrating the use of a bias in the optimization algorithm;

FIG. 4 is a diagram showing, in a schematic way, an example of a method for manufacturing glazing units for buildings, glass panels for solar applications, of the photovoltaic type for example, glass panels for OLED applications, or mirrors or glazing units for motor vehicles, illustrating the main steps, with an example of a logistics chain; and FIG. 5 shows in a schematic way an example of a glass sheet (i.e. a mother glass) for which different defects have been listed.

Figure 6:
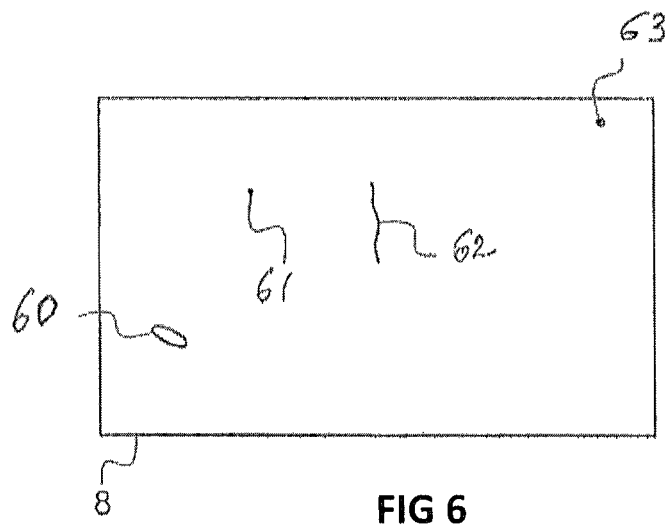

FIG. 6 is a view of a glass sheet in which defects are present; and

Figure 7:
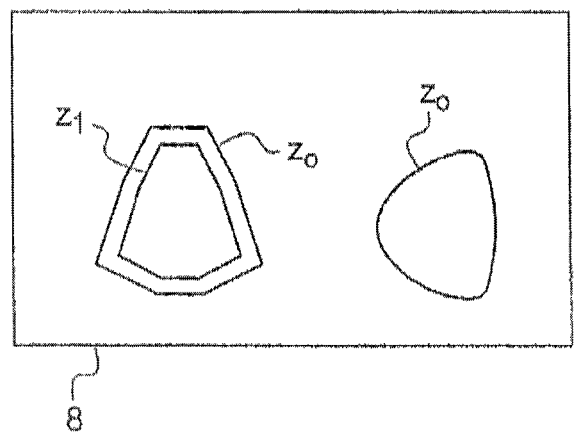

FIG. 7 is a similar view showing different areas of acceptance of the defects in the glass pieces to be cut out.

Figure 1:
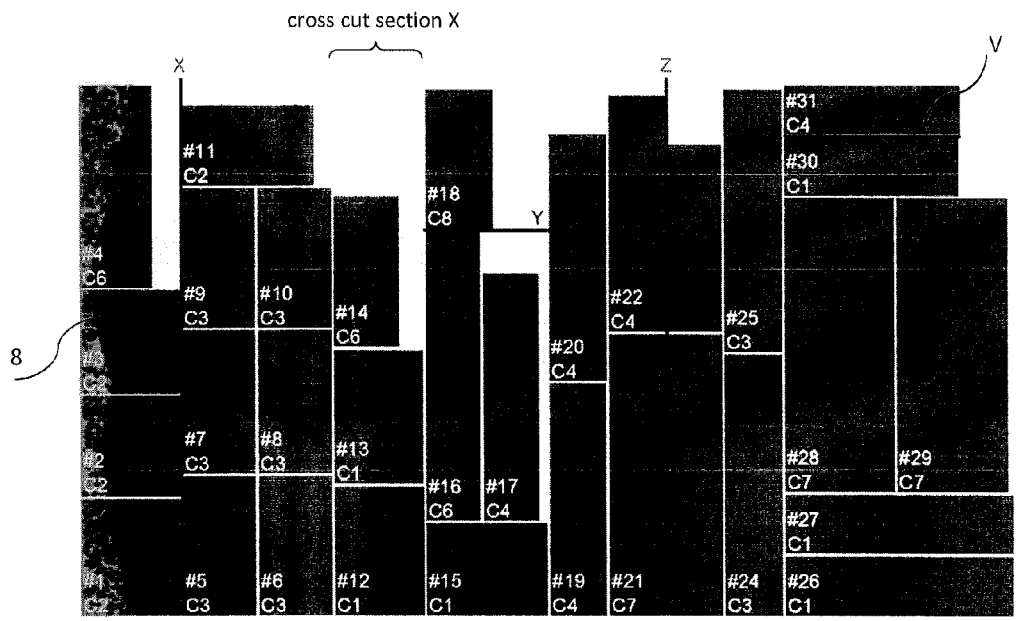
FIG. 1 shows a first optimum cutting plan for a glass sheet, before the defects are taken into account.

FIG. 1 shows, by way of a purely illustrative example, a typical first optimum cutting plan for a monolithic glass sheet. The pieces to be cut out are shown in dark gray and marked with a number preceded by a # symbol and a number preceded by a C, while the offcuts are shown in light gray. The number preceded by a # is the cutting order number, and the number preceded by a C is the number of the trolley for which the piece is intended. The guillotine cutting lines are shown as bolder lines (running from side to side of the piece to be cut out) for three different hierarchical levels: X, Y and Z. In a variant, there may be any appropriate number of hierarchical levels. For example, there may be four levels: X, Y, Z and V.

The first level, generally called X, is said to be the lowest hierarchical rank (an arbitrary choice; it could equally well be the highest rank). Rank Y is ranked immediately above rank X. Rank Z is ranked immediately above rank Y. And rank V is ranked immediately above rank Z.

The notation X, Y, Z, V is conventional, but any appropriate notation may be used.

The cutting constraints described below are due to the fact that guillotine cuts are made, by definition, from side to side of a sheet or a cross cut section, i.e. over the whole width or the whole length of the sheet or section. The invention is specifically intended for application to guillotine cutting methods.

The hierarchical levels of guillotine cutting correspond to the guillotine cutting order. For a given piece, the cutting lines of rank X are cut before the cutting lines of rank Y, which are themselves cut before the cutting lines of rank Z, and so on.

For a given sheet, once a cross cut section of rank X has been cut, the cuts of rank Y can be started on each cross cut section, and the same procedure is followed for any higher ranks. In a variant, however, all the cutting lines of rank X are, for example, cut before the cutting lines of rank Y, which are themselves cut before the cutting lines of rank Z, and so on.

Evidently, therefore, on a cross cut section of rank X, the cuts of rank Y are made first. On a cross cut section of rank Y, the cuts of rank Z are made first. On a cross cut section of rank Z, the cuts of rank V are made first.

It should also be noted that the cutting lines of adjacent ranks are perpendicular.

In FIG. 1, the cutting lines of rank X are vertical, the cutting lines of rank Y are horizontal, the cutting lines of rank Z are vertical, and the cutting lines of rank V are vertical.

In a variant, however, the cutting lines of rank X are horizontal, the cutting lines of rank Y are vertical, and so on.

The different trolleys correspond to different trolleys on which the pieces are placed after cutting, i.e. to different manufacturing paths which the pieces follow after cutting. This relates to their "switching" number.

In this example, this first optimum cutting plan does not take into account any defects present in the glass.

It has been calculated solely as a function of criteria such as the size of the pieces to be manufactured and, notably, their necessary order of manufacturing.

The optimization of the first cutting plan is of any type capable of providing a first optimum cutting plan.

In a variant, however, the first cutting plan also takes the defects into account, as explained below.

Primarily, however, the invention is distinctive in that it provides a second optimization which takes the defects into account and is particularly fast. In fact, this second optimization is intended to be performed a very short time before the cutting (about a minute or less before the cutting), and must therefore be effective in a very short time interval. This is what is proposed by the invention.

Figure 2:
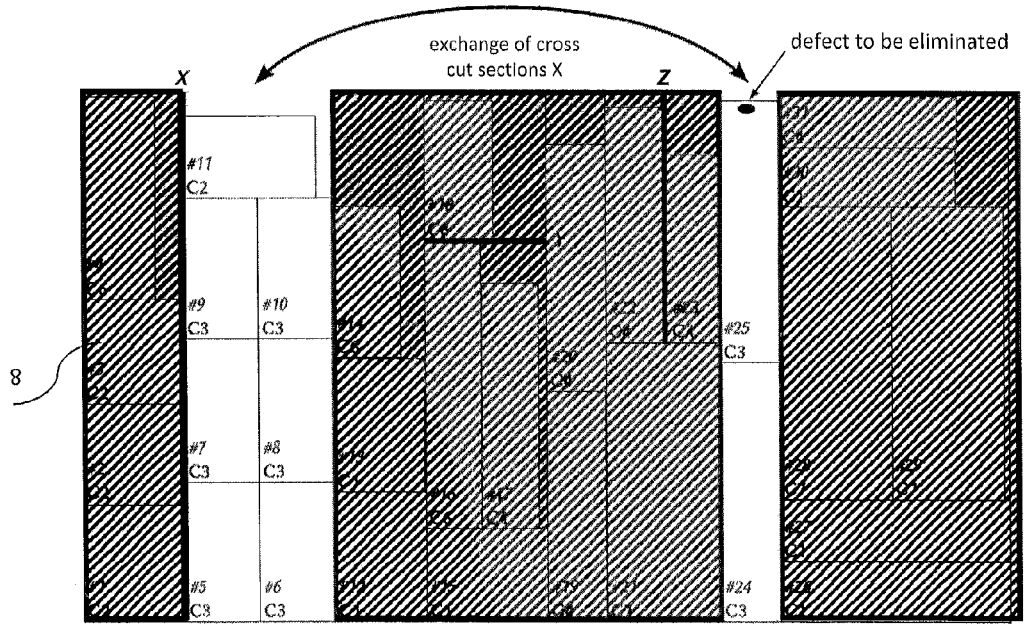
FIG. 2 shows a permutation of guillotine cross cut sections of rank X, performed by a computer in order to optimize the first cutting plan by taking the defects into account.

As shown in FIG. 2, according to one aspect of the invention, the second optimum cutting plan is obtained by automatically generating a cutting plan on the basis of the first optimum cutting plan and as a function of at least some of the information relating to the defects. Most importantly, the generation includes permutations of cross cut sections at the same hierarchical level in the glass sheet (a permutation between two cross cut sections of rank X in FIG. 2), to provide a high speed of execution of the optimization program.

The procedure for obtaining information about the defects will be described subsequently.

The implemented algorithm therefore consists in permutation of different cross cut sections (for example, X, Y, Z and V in FIG. 1, according to the conventional notation for guillotine cutting), while conforming to any constraints on the order of the cut pieces.

More precisely, all the permutations of cross cut sections at identical levels (X, Y, Z or V) are listed (see FIG. 2). Of these permutations, only those which conform to any constraints are accepted: for example, for some customers using trolleys between the cutting line and the manufacturing line, the order of the pieces within the same trolley must be maintained. Thus, the cutting order (for example, from bottom to top and then from left to right in the figure below) of two pieces intended for an identical trolley cannot be modified: the first two cross cut sections X cannot be permuted because of the pieces #1 and #11, both intended for the trolley C2. Similarly, according to this variant in which this constraint is imposed, the exchange of cross cut sections X shown in FIG. 2 will not be validated by the algorithm, since they both contain pieces intended for the trolley C3. In the contrary case, where this constraint would not be taken into account by the algorithm, the exchange of cross cut sections shown in FIG. 2 would evidently be possible.

Constraints on the position of the offcuts may also be present (for example in the case of automated breaking lines) because of mechanical constraints: in this case the offcuts must, for example, be positioned on one (or both) of the ends of a cross cut section, or may be positioned in the middle if their size is sufficient.

These constraints depend on the physical configuration of the cutting line on which the tool is installed.

The order of this list can be optimized and adjusted as a function of the properties of the cross cut sections (the number of offcuts or pieces, the surface are of offcuts, etc.) in order to bias the exploration of the different permutations/exchanges of cross cut sections, as will be described with reference to FIGS. 3a) to 3d). The purpose of this is to accelerate the identification of a solution which can eliminate all the defects, without the need to complete the listing, in order to limit the computing time which is limited by the "real time" nature of the cutting optimization. The term "bias" is taken to mean an empirical rule for choosing the order of listing of the permutations to be performed in the optimization algorithm. By way of example, it may be decided to initially position the cross cut section of rank X having the largest offcut surface area or the cross cut section of rank X having the offcut with the largest surface area on the side of the glass sheet containing the defect to be eliminated by the algorithm.

Preferably, there are constraints on the computing time (for example 30 seconds). After a certain predetermined time interval, calculated by means of a clock, the listing stops if it has not been completed. The resulting solution will not necessarily be optimal, but will be at least equivalent to or possibly better than the solution provided by the first cutting plan. Primarily, however, it is evidently useful to make a careful choice of the order of listing of the possible permutations.

In a variant, the maximum computing time may be of any type which meets the constraints of the manufacturing time.

In a preferred variant, the defects are classed by severity according to their size, type (body or surface), etc. In practice, only the defects whose severity exceeds a certain threshold (which may vary with the application) will be taken into account in the optimization and thus potentially eliminated. The priority for the elimination of these defects is determined by their severity: the defect having the greatest severity will be considered as a priority in the optimization. Once a defect has been eliminated by positioning an offcut section on the defect, the sections including this defect can no longer be moved by the algorithm to eliminate other defects.

More precisely, during the listing performed by the algorithm, the location of the defects is taken into account when deciding whether or not to accept the cutting plan produced by the permutation concerned. The rules are, for example, as follows:

A new cutting plan (obtained after permutation) is only accepted by the algorithm if the losses of glass (due to a defect present in a piece to be cut out) are less than those of the best plan of those already tested during the listing. More precisely, this criterion is applied for the most critical/severe defect as a priority, then for the second defect if no improvement is possible at the level of the first defect, and so on. It should be noted that this does not necessarily result in the minimization of the total amount of glass losses due to the defects, but rather to the minimization of the amount due to the most critical/severe defect, then to that due to the second defect, and so on.

The aim is to minimize the loss of material caused by a defect; that is to say, the algorithm attempts to position the geometrical offcuts (created by the cutting optimization software which has generated the cutting plan) on the defects to be eliminated. If this is impossible, the algorithm attempts to position the smallest possible piece on the defect to be eliminated. It should be noted that, in the case of applications intended for use in construction, for example, the cut glass is intended for producing insulating glazing units in which a strip of mastic or butyl is applied to the periphery of the glass over a typical width of 10-15 mm. If this is so, the presence of defects in this strip is not troublesome, and the algorithm considers this case as being intermediate between a defect present in an offcut and a defect present in a piece. Thus a defect will be positioned preferably in an offcut, then in this border intended for the future frame, and finally in a piece having the smallest possible surface area. This may be extended to the case in which complex shapes (circles, polygons, etc.) are subsequently cut from the rectangular piece. In this case, the geometry of the border becomes more complex and it may not necessarily be a strip of fixed width.

FIGS. 3a) to 3d) show an example which illustrates a possible implementation of the optimization algorithm.

As seen in FIG. 3a), the presence of a defect (black square) may be noted.

The permutations of cross cut sections at identical hierarchical levels are initially listed by the algorithm.

All permutations which do not conform to the manufacturing constraints, such as the order of arrival of the pieces on the trolleys, are then rejected by the algorithm.

The basic listing algorithm is as follows (all actions are to be interpreted as being performed by the program):

i)—the initial configuration is stored;

ii)—the cross cut section at level n is considered (starting at n=0, the whole glass sheet);

iii)—If the most severe defect to be eliminated is in this section (this is always the case at rank n=0), the "child" cross cut section at a higher level n+1 is searched for, and the algorithm returns to the preceding line ii) for this section. If the defect is not in this section, the step of the preceding line ii) is repeated for the "sibling" section at the same level containing this defect;

iv)—step iii) is repeated, increasing the level until the section at the highest level n+p containing this defect is reached;

v)—if this section is an offcut, the configuration is stored and the algorithm moves on to the next defect to be eliminated (the algorithm is restarted for the next defect without modifying the position of the sections containing the first defect or defects, i.e. the defects processed previously). Otherwise, before moving on to line vi), the configuration is stored if the surface area of the section is smaller than or equal to the surface area of the section containing the defect in the previously stored configuration;

vi) all the possible permutations of this section with its "sibling" sections at the same hierarchical level n+p having the same "parent" (at the level n+p−1) are listed (in lexicographic order, for example, or with a bias). For each permutation, the step of line ii) is repeated for the "sibling" section at level n+p containing the defect (i.e. the presence of child sections in this new section containing the defect is verified, and the child section containing the defect is searched for);

vii)—If no permutation causes the defect to be positioned in an offcut at level >=n+p (among the siblings and their descendants), the hierarchical level is reduced to n+p−1 and the algorithm restarts from line vi) for the parent at level n+p−1.

viii)—Line vii) is repeated until n=0 is reached, or until there are no more "siblings".

It should be noted that, in FIGS. 3a) to 3d) the program also incorporates a bias.

The bias is as follows: instead of using the lexicographic order as indicated in the above algorithm for the order of listing of the permutations, the sections are sorted as a function of the largest offcut surface area (on the surface) contained by them.

In FIG. 3a), therefore, X2 is exchanged with X4 to eliminate the defect because X4 has the largest offcut on the surface.

Figure 3B:
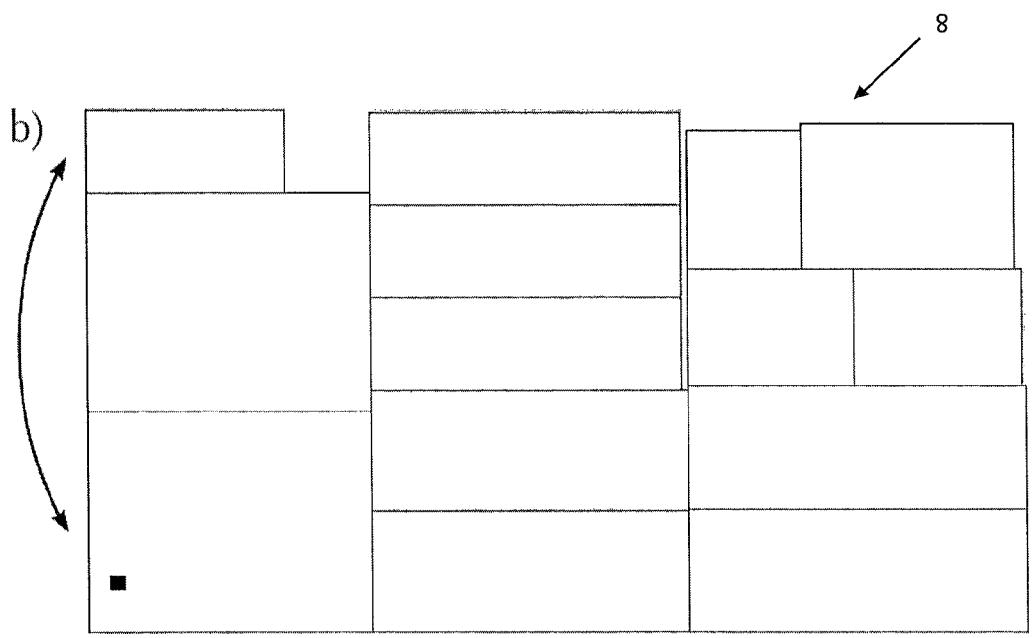

In FIG. 3b), X4Y1 is exchanged with X4Y3.

Figure 3C:
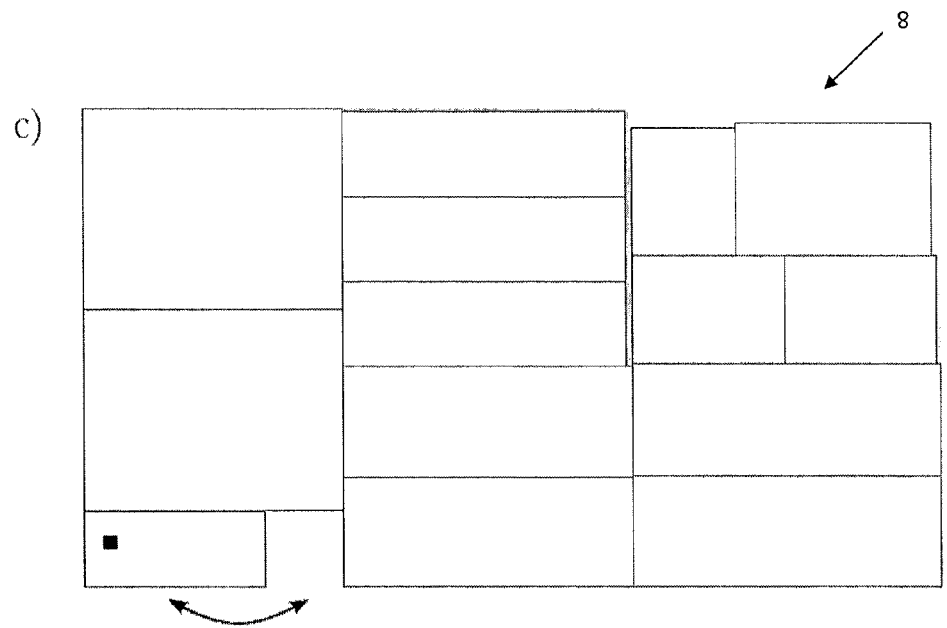

In FIG. 3c), X4Y3Z1 is exchanged with X4Y3Z2.

Figure 3D:
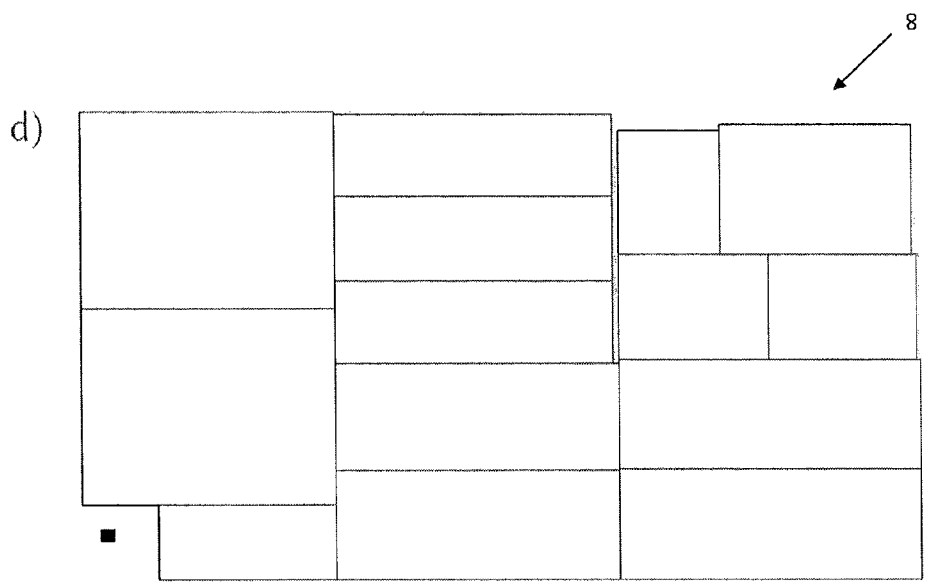

The defect is eliminated in FIG. 3d).

In the method described above, the first optimum cutting plan and the second optimum cutting plan are for the same glass sheet. The optimization is performed independently for each glass sheet.

In a variant, operation on the scale of several sheets (typically less than four) is envisaged, in order to increase the rate of elimination of the defects. This is possible, in practice, if the identification of the sheets is carried out far enough upstream of the cutting line. The information on the positions of the defects can then be used in a more comprehensive manner. It is thus possible to:

permute the cutting plans of the sheets awaiting cutting in order to minimize losses by making use of the fact that not all the cutting plans are equivalent for the elimination of the defects of the same map.

choose the most appropriate cutting plan for the defect map of the waiting sheet from among the set of future cutting plans (plans calculated in advance during the optimization performed upstream for a batch of several tens of sheets, for example). It should be noted that this is only possible subject to the limitation of conformity with any constraints on the order of the pieces to be cut.

There are several possible solutions:

All the possible permutations of sheets are performed, with the optimization of the cutting plan in the presence of defects presented previously within each sheet. The sheet permutation which minimizes losses over the whole set of sheets considered is then accepted.

It is also possible to make use of an empirical correlation which has been identified between the complexity of the cutting plan (depending, for example, on the number of offcuts, the offcut surface area, the distribution of the offcuts as a function of their level in the hierarchy resulting from the guillotine cutting or as a function of another criterion of any suitable type) and its capacity to eliminate a defect. This makes it possible to reduce computing time markedly by avoiding the testing of all the possible sheet permutations (the number of which may become unacceptable above only a few sheets).

Thus a complexity value is assigned to each of the first optimum cutting plans of each of said plurality of glass sheets, the permutations between first (optimum) cutting plans being performed, as a priority, as a function of said complexity values. The complexity values are assigned as a function of at least one of the number of offcuts, the surface area of the offcuts, and the distribution of the offcuts at the different hierarchical levels of the guillotine cutting.

After a cutting plan has been assigned to a sheet, the optimization described above for a sheet is applied.

In a variant, however, the cross cut sections of the lowest rank, i.e. rank X, are permuted between sheets and not on a single sheet.

In the embodiments described above, the permutations of the guillotine cross cut sections are performed with a constant size and number of offcuts between the first optimum cutting plan and the second optimum cutting plan.

In a variant, the optimization algorithm can be used to reorganize the cutting plan by dividing the offcuts into sub-parts in order to increase the number of possible permutations.

As a general rule, the permutations of the cross cut sections are carried out with a constant offcut surface area between the first optimum cutting plan and the second optimum cutting plan. This is because a permutation of cross cut sections at the same levels does not change the offcut surface area.

The broader context of the invention will now be described.

FIG. 4 is a diagram illustrating a non-limiting example of a manufacturing process to which the different aspects of the invention described above may be applied, this figure being provided in order to facilitate the understanding of the context in which the invention was developed and in which the invention may be applied.

In this example, the upper part of the diagram relates to the steps of the manufacture of a glass sheet at the premises of a glass manufacturer on a first manufacturing site, and the lower part relates to the steps of manufacture of glass for an application, such as glass for motor vehicle glazing, glass panels for solar applications, photovoltaic for example, glass panels for OLED applications, mirrors or glazing for buildings, at the premises of a second manufacturer, the customer of the first manufacturer, on a second manufacturing site. This example is not limiting. One or more supplementary steps may be performed on the first and/or the second site. Additionally, although all the manufacturing steps of the first manufacturer are shown as being performed on a single manufacturing site, there may be more than one site involved, and the same applies to the manufacturing steps performed by the second manufacturer. Furthermore, although the second manufacturer is described as a customer of the first manufacturer, in a variant the second manufacturer may be a branch or subsidiary of the first manufacturer.

Thus, as a general rule, the set of steps may, in a variant, be performed by the same manufacturer, or the work may be divided in any suitable way.

In this specific example, the first manufacturer produces, in a "float glass" factory 2, a continuous ribbon 4 of float glass on a bath of tin. Defects in the ribbon 4 are analyzed by a detection device 6 (of any suitable type), after which the ribbon is cut into glass sheets 8 (also called "mother glass" or "PLF" for "plateau large format", i.e. "large format sheet").

It should be noted that the detection device 6 is, for example, a device called a "scanner" in the industry, intended to analyze the glass in order to detect defects in it.

Information about the attributes relating to each glass sheet 8 are stored in a database 10. The attributes may include, for example, the thickness of the glass, the date of manufacture, the time of manufacture, the manufacturing site, the serial number of the manufacturing machine, the number of defects, the position of the defects, the type of defects, the density of the defects, the severity criterion of the defect, or any combination of these. This example is not limiting. Other attributes of the ribbon of glass may be stored in the database. The database 10 may be centralized or distributed, and may include one or more sub-databases. The sub-databases may be connected to a main database and/or interconnected, using various means of communication. The database and/or the sub-databases may take various forms. For example, the database and/or the sub-databases may each take the form of a portable storage unit (e.g. a disk, CD-ROM, DVD-ROM, USB storage device, or other similar medium).

It should also be noted that the term "defect" is used here in the broadest sense and is not limited to an imperfection in the glass sheet. It may be a distinctive characteristic of the glass. Furthermore, an imperfection may be acceptable in some cases and not in others, depending, for example, on the intended application of the glass sheet. Glass sheets intended for the semiconductor field will be, for example, more sensitive to surface defects, whereas defects in terms of transmission or reflection may be more important in the field of glazing for motor vehicles or buildings.

After analysis for the presence of defects, the glass ribbon is cut into glass sheets (mother glasses), using a cutting device. The areas of the glass ribbon which include defects considered unacceptable or outside standards or specifications may be eliminated during the stage of cutting the sheets.

A mapping device, including the detection device, may be used to generate the map of attributes, for example by scanning the glass ribbon 4 and recording the position and type of each defect present in the glass ribbon 4 in the database 10 which is kept in a storage device. A severity criterion is also recorded in the database. This is a qualitative parameter indicating a degree of severity of a defect. For example, the severity criterion may be expressed as a distance between adjacent defects below a predetermined value, or a density of defects of a certain size above a predetermined value.

The information on the defects of each glass sheet 8 (mother glass) is stored in the database 10. An identifier 12, for example a bar code, an RFID chip, or other identifier 12 of any suitable type, is used to identify the glass sheet 8. In the case of a bar code, the marking of the identifier is carried out, for example, by means of ink or a laser.

The map of attributes may take various forms. As a general rule, it is a file (including one or more sub-files), for example an electronic file, including, for example, the position, size and type of each defect of the glass sheet 8 and/or the severity criterion of the defect. The map of attributes may also include supplementary information such as the severity of the defect, the composition of the glass, the date of manufacture, or the like. The map of attributes is, for example, in the form of a table.

In one embodiment, the attributes of each sheet, including the position of the defects and the severity criterion of a defect, may be stored in the database 10 in a storage medium such as a hard disk, a storage server, or the like. For example, the database 10 may form part of the computer system 21. However, as a variant or in a supplementary way, the attributes may also be stored in an electronic storage device or the like. In one embodiment, the storage medium, including the hard disk, the storage server, the electronic storage device, or the like, may be read by means of a computer communicating with the database 10 by means of a communication link. The communication link may be established via a direct wire, via the internet (the "cloud") or via any other wireless network such as a cellular network.

The resulting glass sheets 8 are then arranged in a stack of glass sheets 14. The stacks of sheets 14 can be stored in the form of pallets 16 of glass sheets and conveyed to the processing unit 18 for processing. The processing unit 18 may be located at a different place from the factory 2. In one embodiment, in the processing unit 18 the glass sheets 16 are processed by the deposition of a coating by means of a "coater". For example, at least one dielectric coating or layer may be deposited on one or more of the glass sheets.

After processing in the processing unit 18, the glass sheets 16 can be analyzed or inspected by a second detection device 20 (a scanner, for example). In one embodiment, the second detection device 20 forms part of the mapping device. The analysis of the glass sheets 16 by the device 20 makes it possible to detect further defects which may have been created during the processing in the processing unit (by being created during the layer deposition process, for example).

The detection device 20 can not only analyze the glass sheets 8 in glass stacks 16 for other defects, but can also read the unique identifier on each of the glass sheets 8. As a result of the identification of each glass sheet 8 in the stack 16 of glass sheets 8, the further defects detected by the device 20 can be linked to the identifier associated with the sheet and added to the other defects of the corresponding glass sheet. Therefore, in one embodiment, the database 10 is updated, using the computer system 21, with the information on any further defect relating to each glass sheet 8.

After the processing of the stack 16 of glass sheets 8 in the processing unit and after the glass sheets 8 have been analyzed by using the detection device 20, the glass sheets 8 are restacked in a stack 22 and stored in the warehouse 24. The warehouse 24 may be on the same site as the processing unit 18, or on a different site. In one embodiment, the glass sheets 8 may be arranged and stored in the database containing the information on defects present in the glass sheets 8.

The stacked and stored glass sheets 8 may then be conveyed (using trucks or trains, for example, or any other means of transport) to the customer, that is to say to the second glass manufacturer. The customer receives the stack 22 of glass sheets 8 from the warehouse 24 and carries out other processes on the glass sheets to manufacture glass products. For example, the customer may cut the glass sheets into several pieces having the desired shapes or sizes. The cut glass pieces may have the same shape or different shapes. Similarly, the cut glass pieces may have the same size or different sizes, and so on.

On the customer's side, a computer system 28 may be used to define the contours for cutting the glass pieces. The computer system 28 may execute a program which provides a first optimum cutting plan to produce desired glass pieces while minimizing the amount of glass which is rejected and recycled because of the presence of defects which are outside the specifications and which are, for example, determined by the second manufacturer or the end customer (for example, the motor vehicle manufacturer or the manufacturer of windows or the like). The program may be integrated into a medium readable by a machine coded with instructions for executing the cutting operation.

The customer or the second manufacturer uses a reader to read the identifier 12. By reading the identifier 12, the customer may access the database 10 to retrieve information on the attributes of the glass sheet 8, which is associated with the identifier 12. In one embodiment, the computer system 28 is configured to access the database 10 to retrieve information on the attributes of the glass sheet 8, including the identifier 12 which is read by the reader. The attributes comprise, among other parameters, the position of the defect, the difficulty criterion and the severity criterion. In one embodiment, the computer system 28 may access the database 10 via a network such as the internet or via a dedicated communication line, or by wireless communication (cellular communication, for example).

In one embodiment, some information on the attributes of the glass sheet is filtered using a filter 30. It should be noted that the filter 30 may be a computer program which is executable by the computer system 28, for example by a processor of the computer system 28. The filter 30 may be resident in the computer system 28 in one embodiment. Alternatively, the filter 30 may be separate from the computer system 28. Because of the filter 30, the customer cannot access the full database, but only a selected part of the database containing the attributes of the glass sheets 8. The amount of information which the customer can access is controlled by the first manufacturer using the filter 30. For example, the amount or level of information which can be consulted by the second manufacturer or a customer may be determined by the first manufacturer according to a sum of charges or a fee or a premium paid by the customer to the first manufacturer. For example, the first manufacturer may define a plurality of levels of access, for example three levels of access, namely an upper level, a medium level and a lower level (referred to as platinum, gold and silver in one embodiment, for example), with the upper level (platinum, for example) giving access to the largest amount of information in the database and the lower level (silver, for example) giving access to the smallest amount of information in the database. For example, the customer may purchase access rights at the highest level (platinum, for example) by paying a higher premium. On, the other hand, the customer may also purchase access rights at the lower level only (the silver level, for example), by paying a smaller premium. Although three levels are mentioned in this document, it will be appreciated that any number of access levels may be provided in other embodiments.

According to one embodiment, a level of access to the database 10 is provided for the customer so as to enable the customer to retrieve at least part of the map of attributes of each sheet in the stack of sheets. More precisely, in one embodiment, the computer system 28 comprises a computer product, for example a machine-readable medium, which is coded with machine-readable instructions, such that the map of attributes cannot be used by the computer system 28 to provide an optimized cutting procedure for manufacturing the desired glass pieces. However, the machine-readable instructions prevent the user of the computer system 28 from retrieving, recording and/or displaying maps of characteristics or attributes accessible by the computer system 28. Thus the customer is prevented from collecting information on the defects in the glass sheets for the purpose of data exploration or statistical analysis.

Depending on the access level, a greater or lesser part of the information stored in the database 10 is supplied to the customer. In one embodiment, the first manufacturer constructs a sub-database of the database which can be consulted by the intended customer according to the access level purchased by the customer by paying a premium or charges. The sub-database contains information filtered by means of the filter 30. The filter 30 can therefore be configured by the first manufacturer to supply the sub-database according to the access level purchased by the customer.

In this embodiment, it is possible for the data in the database 10 not to be encrypted, since the customer does not have direct access to the database 10. This is because the customer can only access and read the data stored in the sub-database which is personalized according to the access level purchased by the customer by paying a certain premium. Consequently, the customer is not able to read all the data or information stored in the database 10, but can simply read the data or information stored in the sub-database which is intended for the customer or supplied to him.

In another embodiment, access to the database 10 may be provided to the customer. In this case, the data in the database 10 are encrypted. The database may be encrypted by using appropriate known encryption algorithms. For example, the encryption may be carried out by using one or more processors of the computer system 21. The customer is provided with a special key for reading the specific data stored in the database 10. The key allows the customer to "unlock" and read the data intended exclusively for the customer. The key does not allow the customer to read other data which are stored in the database and which are not intended for the customer. In other words, the access to the data contained in the database 10 is limited according to a desired access level purchased by the customer by paying a premium.

The key may be a password or other type of identification supplied to the customer or to a computer program (or a link to a computer program) which enables the customer (for example, the computer system 28 which is designed to perform the cutting operation) to access the data in the database 10.

In this variant, the computer system 28 may also include a computer product, for example a machine-readable medium, which is coded with machine-readable instructions, in such a way that the map of attributes cannot be used by the computer system 28 exclusively to provide an optimized cutting procedure for manufacturing the desired glass pieces. However, the machine-readable instructions prevent the user of the computer system 28 from retrieving, recording and/or displaying maps of characteristics or attributes accessible by the computer system 28. Thus the customer is prevented from collecting information on defects in the glass sheets for the purpose of data exploration or statistical analysis.

FIG. 5 is a schematic diagram showing an example of the supply of sub-databases to specific customers according to one embodiment. The attributes of the glass sheets 8 are stored in the database 10. In one embodiment, the database 10 may comprise a plurality of local databases 10A, 10B and 100, derived for example from different factories of the first manufacturer. In another embodiment, the database 10 may be configured to communicate with local databases 10A, 10B and 100 to retrieve the data stored in them. For example, the database 10 may be hosted on a storage server which is configured to access the plurality of local databases and retrieve the data stored in them. A filter 30 can be used by the first manufacturer to provide a plurality of sub-databases 41, 42 and 43 derived from the database 10. The sub-database 41 cannot be consulted by the customer 51, the sub-database 42 cannot be consulted by the customer 52, and the sub-database 43 cannot be consulted by the customer 53. The filter 30 can be configured according to the data access level purchased by each of the customers 51, 52 and 53. For example, the filter 30 may be configured at level 1 to provide sub-bases 41 containing data at level 1 (the silver level, for example); the filter 30 may be configured at level 2 to provide sub-bases 42 containing data at level 2 (the gold level, for example), and the filter 30 may be configured at level 3 to provide sub-bases 43 containing data at level 3 (the platinum level, for example). For example, level 1 (the silver level, for example) may generate sub-databases 41 which contain a first limited part of the data on the attributes. For example, at level 1, the sub-database 41 can contain only the position of the defects and not the characteristics of the defects such as the size or shape of the defect. For example, at level 2, the sub-database 42 can contain, as well as the position of the defects, the size and shape of the defects. For example, at level 3, the sub-database 43 can contain, as well as the position of the defects, the size and shape of the defects, the severity criterion, etc. Therefore, level 3 is a higher access level giving access to more information and data in the database 10.

In one embodiment, the three levels are three acceptable levels of severity of defects, so that more or fewer of the defects are transmitted to the customer, depending on the expected quality.

In one embodiment, the sub-databases 41, 42 and 43 may be encrypted to prevent the respective customers 51, 52 and 53 from being able to perform statistical analyses on the data stored in the databases 41, 42 and 43. For example, the customer 51 may be able to read the data stored in the database 41 to the extent that the data stored in the database 41 are used solely for cutting purposes, while being unable to perform analyses on the data stored in the sub-database 41 to carry out a statistical analysis and extract statistical information on the attributes (for example, the defects) in the glass sheets 8. For example, the customer's computer system 28 may comprise a computer product, for example a machine-readable medium, coded with instructions executable by a machine which enables the customer to read the data stored in the database (for example 41, 42, 43) in order to provide an optimized cutting procedure, but which prevents the user of the retrieval system computer 28 from recording and/or display cards of characteristics.

In one embodiment, the data are not encrypted at any point in the method, and are therefore readable by the customer. However, the device always aims to prevent the unrestricted large-scale collection of data.

According to one embodiment, the first and/or second optimum cutting plan is generated from data stored in the database, the data comprising attributes of each glass sheet to be cut. The cutting plan may be generated either by the first manufacturer or by the customer or second manufacturer, or by a third party independent of the first manufacturer and the second manufacturer. In one embodiment, the third party may be, for example, an enterprise which manufactures cutting devices or tools for cutting the glass sheets.

It should be noted that it is possible for the first optimum cutting plan not to take the defects into account, in which case only the second cutting plan takes them into account.

If the optimization or generation of the first cutting plan takes place at the premises of the first manufacturer, and if the first cutting plan takes the defects into account, since the first manufacturer has full access to the database 10, there is no need to encrypt the database. In this situation, the first manufacturer may receive a specification (sizes, shapes, etc.) for the glass pieces that are to be manufactured by the second manufacturer. The first manufacturer may use the constraints of shape and size and may also use the attributes of the glass sheet, including the position of all the defects, etc., to generate the first cutting plan or to send a file to the customer containing the first cutting plan for the glass sheets delivered to the customer.

However, if the generation of the first and/or second optimum cutting plan takes place at the premises of the second manufacturer or of a third party, the database 10 is encrypted to ensure that the data stored in the database 10 are not accessible, or that only the data for which the customer (the second manufacturer) or a third party have paid are accessible. In this situation, the first manufacturer simply supplies the attributes purchased by the customer for the customer or a third party who, in turn, uses the data to generate the first optimum cutting plan.

The generation of the second optimum cutting plan is normally intended to take place at the premises of the second manufacturer or customer or at least at the premises of the manufacturer carrying out the cutting of the glass pieces in the glass sheets. The aim of the second optimization is, in fact, to be carried out as closely as possible (in terms of time) to the cutting operation. It is typically carried out by reading the identifiers of the glass sheets less than one minute before the corresponding glass sheet is positioned on the cutting table, to ensure that the glass sheet for which the optimization is carried out will actually be cut.

In a variant, however, it is possible to read the identifier earlier, for example at the time of the unstacking or immediately before the unstacking of the glass sheets at the premises of the second manufacturer.

The automatic generation of the second optimum cutting plan is, for example, executed by the same computer system 28. In a variant, however, another computer system may be used, for example one adapted to communicate with the computer system 28.

After the generation of the second optimum cutting plan, the glass sheets are cut by guillotine (i.e. across the whole width of the glass and at different successive orientations at different hierarchical levels) according to the cutting plan that the computer system 28 has calculated for each glass sheet 8. In one embodiment, the glass pieces resulting from the cutting of the glass sheets 8 may be washed 34. The cut and washed glass pieces may be analyzed, if necessary, by a third detection device 36 and then sent for assembly, for example by being installed as motor vehicle windows or windshields, or as the windows of a building, etc.

In a motor vehicle windshield, two cut glass pieces are bent and bonded together (i.e. laminated) by means of a thermoplastic interlayer, of the PVB type for example. In a glazing unit for buildings, two or three glass pieces are assembled in a frame to form, respectively, a double or triple glazed unit, separated, for example, by layers of gas, chosen for example from argon and air.

According to one embodiment, the first optimum cutting plan is generated in a dynamic manner for each of the glass sheets, and may or may not be based on the information on the defects stored in the database 10.

FIG. 6 shows an example of a glass sheet 8 with various defects which have been catalogued. For example, the defects may include different types such as a "pinhole" which is a defect in the coating 61, a bubble defect 60, a scratch defect 62 on the glass, or a surface defect 63. For example, a first optimum cutting plan for a single glass sheet may be generated so as to produce glass pieces of identical size. For example, the glass sheet has defects of a single type and a single size, which are not acceptable in the glass pieces to be cut (or "primitives").

In one embodiment, a target function of several representative quantities to be optimized is maximized or minimized. This is described, for example, in WO2012/164200, a patent application filed by the present filing party. In a variant, however, an algorithm and software of any suitable type are used to generate the first optimum cutting plan, taking into account the size of the pieces to be cut and any manufacturing constraints.

By way of example, in one embodiment, the shapes of the glass pieces to be cut in the cutting plan, also called "primitives" in the industry, may be rectangles, as seen in FIG. 4.

However, as may be seen, the glass pieces to be cut may have any desired shape, for example a polygon, a circle, an ellipse, or any other more complex shape, as shown in FIG. 7. For example, although the general shape of the glass pieces to be cut may be polygonal, the pieces may be rounded or have curved edges, as shown in FIG. 7.

Furthermore, some areas of the pieces to be cut may have different defect acceptance criteria, as explained above. A defect which is, for example, unacceptable in the center of the piece to be cut may, for example, be acceptable on the periphery of the piece. This is why, for example, different areas of acceptance of defects are defined on the glass pieces, for the purpose of carrying out the second, and possibly the first, optimization. Examples of areas are shown in FIG. 7.

The process shown in FIG. 1 may be generalized to manufacturing methods of any appropriate type. The number of steps of defect analysis is not limited to the steps illustrated here, but includes any number of steps adapted to the manufacturing constraints.

In one embodiment, the identifiers 12 may be provided on a segment of glass sheet 8. Thus the identifier 12 on each of the glass sheets 8 can be read, even if the glass sheets are stacked together.

According to one embodiment, instead of identifying each glass sheet 8 and having a database for storing the information on the defects, it is possible to mark the defects using an ink of a predetermined color, with predetermined characters or symbols on the defect itself or in its vicinity. The customer will then be able to identify the different types of defect and the size and position of the defects, and can generate information on the defects which is useful for the cutting plan optimization program or programs.

In one embodiment, the guillotine cutting of the glass sheets first takes place vertically along the width of the glass sheet 8 for all the cutting lines at the first hierarchical level (rank X), and then horizontally along the width of the cross cut section, for all the cutting lines at the second hierarchical level, and so on for the higher cutting ranks. In another embodiment, the cuts at the lowest hierarchical level are made horizontally along the length of the glass sheet 8 and then vertically, and so on.

A method for identifying defects in the glass is provided. The method comprises the identification, using an identification device, of each of the plurality of glass sheets with an identifier, and the generation, using a mapping device, of a map of attributes for each glass of the plurality of glass sheets. The method further comprises the association, using a computer system, of the map of attributes of each of the plurality of glass sheets with the corresponding identifier of each of the plurality of glass sheets; the storage of the map of characteristics of each glass of the glass sheets in a database; and supply to a customer with a level of access to the information in the database so as to enable the customer to retrieve at least a part of the map of attributes of the glass sheets purchased by the customer.

In some embodiments, the application programs for the execution of the methods may be in the form of programs in a computer, such as a personal computer or a server, or in a distributed computer environment comprising a plurality of computers. The computer may comprise, for example, a desktop computer, a laptop computer, a handheld computer device such as a personal digital assistant, or the like. The computer program products may comprise a computer-readable medium or storage medium or a medium containing stored instructions used to program a computer to execute the methods described above. Examples of appropriate storage media comprise disks of all kinds, including diskettes, optical disks, DVDs, CD-ROMs, magnetic optical disks, RAMs, EPROMs, EEPROMs, magnetic or optical cards, hard disks, flash cards (for example, a USB flash card reader), PCMCIA memory cards, smart cards, or other media. Alternatively, part or all of the computer program product may be downloaded from a remote computer system or a server via a network such as the internet, an ATM network, a wide area network (WAN) or a local network.

The programs are stored on one or more computer-readable media. The programs may include software for controlling either the hardware of a general-purpose or special-purpose computer or a processor. The software also enables the computer or processor to interact with a user via output peripherals such as a graphic user interface, a head mounted display (HMD), or the like. The software may also include, but is not limited to, peripheral drivers, operating systems and user applications.

Although the various steps of the method described in the paragraphs above are described as taking place in a certain order, the present application is not limited by the order in which the various steps take place. In fact, in variant embodiments, the various steps may be executed in an order other than the order described above.

Although the invention has been described in detail for illustrative purposes on the basis of what are currently considered to be the most practical and feasible embodiments, these details are evidently provided solely for this purpose and the invention is not limited to the embodiments described, but is intended to cover equivalent modifications and arrangements within the spirit and scope of the attached claims. For example, it is evident that the present invention envisages that, where possible, one or more characteristics of any embodiment may be combined with one or more characteristics of the other embodiments.

The invention claimed is:

1. A method for cutting out a plurality of pieces of glass from at least one glass sheet, comprising, in sequence:
   automatically generating a first optimum cutting plan, by a computer with a storage unit containing programs adapted to calculate the first optimum cutting plan for guillotine cutting at a number of hierarchical levels of different pieces from each of said at least one glass sheet, as a function of information concerning the pieces to be cut out;
   reading information relating to defects in said at least one glass sheet,
   wherein the method comprises, additionally and subsequently:
   automatically generating a second optimum cutting plan, by a computer with a storage unit containing programs adapted to calculate the second optimum cutting plan for guillotine cutting at a plurality of hierarchical levels from said at least one glass sheet, on the basis of said first optimum cutting plan and as a function of at least some of the information relating to the defects, including permutations of cross cut sections at the same hierarchical level within said at least one glass sheet;
   cutting pieces of glass in accordance with said second optimum cutting plan generated.

2. The method as claimed in claim 1, wherein the permutations of the cross cut sections are carried out with a constant offcut surface area between the first optimum cutting plan and the second optimum cutting plan.

3. The method as claimed in claim 2, wherein said automatically generating is carried out with a constant number and size of offcuts.

4. The method as claimed in claim 1, wherein said first optimum cutting plan and said second optimum cutting plan are those for a single glass sheet.

5. The method as claimed in claim 1, wherein said first optimum cutting plan and said second optimum cutting plan are the cutting plans for a plurality of glass sheets.

6. The method as claimed in claim 5, wherein the automatically generating of the second optimum cutting plan includes performing permutations of the first optimum cutting plan of a glass sheet from among said plurality of glass sheets with the first optimum cutting plan of another glass sheet from among said plurality of glass sheets.

7. The method as claimed in claim 6, wherein a complexity value is assigned to each of the first optimum cutting plans of each of said plurality of glass sheets, the permutations between first optimum cutting plans being performed, as a priority, as a function of said complexity values.

8. The method as claimed in claim 7, wherein said complexity values are assigned as a function of at least one of the number of offcuts, the surface area of the offcuts, and the distribution of the offcuts in the different hierarchical levels of the guillotine cutting.

9. The method as claimed in claim 1, wherein the permutations of the cross cut sections are carried out in conformity with constraints.

10. The method as claimed in claim 9, wherein the constraints include constraints as to the order of cutting of said pieces.

11. The method as claimed in claim 9, wherein the constraints include constraints as to the position of the offcuts.

12. The method as claimed in claim 1, wherein the computer is programmed to list said permutations of the cross cut sections, a new cutting plan produced after a permutation being accepted or rejected by the computer as a function of performance criteria of a resulting cutting plan with respect to a preceding cutting plan.

13. The method as claimed in claim 12, wherein said permutations of the cross cut sections are listed by the computer in an order chosen as a function of properties of the cross cut sections.

14. The method as claimed in claim 13, wherein said properties of the cross cut sections include at least one of the number of offcuts, the number of pieces to be cut out, and the surface area of the offcuts.

15. The method as claimed in claim 1, wherein the defects to be eliminated are prioritized by the computer.

16. The method as claimed in claim 15, wherein the defects are prioritized as a function of their position.

17. The method as claimed in claim 15, wherein said information concerning the defects include severity values assigned to at least some of the defects, the automatic generation of the second optimum cutting plan being performed by the computer as a function of said severity values.

18. The method as claimed in claim 17, wherein the computer is programmed to list said permutations of the cross cut sections, a new cutting plan produced after a permutation being accepted or rejected by the computer as a function of performance criteria of a resulting cutting plan with respect to a preceding cutting plan, and wherein said performance criteria include the elimination of the most severe defect.

19. The method as claimed in claim 1, wherein said permutations are stopped after a predetermined computing time, even if other permutations were programmed, the final cutting plan produced by the computer then becoming said second cutting plan.

20. The method as claimed in claim 19, wherein said predetermined time interval is less than one minute for a machine performing about $10^{10}$ (floating point) operations per second (Gflops).

21. The method as claimed in claim 1, wherein some of the pieces to be cut out have different dimensions.

22. The method as claimed in claim 1, comprising, before the automatically generating of said first optimum cutting plan:
   analyzing defects in said at least one glass sheet;
   storing information relating to the defects detected in said at least one glass sheet,
   the reading performed after the automatically generating of the first optimum cutting plan comprising identifying said at least one glass sheet and accessing the information stored in the analyzing.

* * * * *